United States Patent
Clark et al.

(10) Patent No.: US 9,207,999 B2
(45) Date of Patent: *Dec. 8, 2015

(54) INTEGRATED LINK-BASED DATA RECORDER FOR SEMICONDUCTOR CHIP

(71) Applicant: International Business Machines Corporation, Armonk, NY (US)

(72) Inventors: Scott D. Clark, Rochester, MN (US); Ashish A. More, Bangalore (IN); Anil Pothireddy, Bangalore (IN); Sudheendra K. Srivathsa, Bangalore (IN); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 115 days.

This patent is subject to a terminal disclaimer.

(21) Appl. No.: 14/055,099

(22) Filed: Oct. 16, 2013

(65) Prior Publication Data

US 2014/0359641 A1    Dec. 4, 2014

Related U.S. Application Data

(63) Continuation of application No. 13/909,686, filed on Jun. 4, 2013.

(51) Int. Cl.
*H04L 12/28* (2006.01)
*G06F 9/54* (2006.01)

(52) U.S. Cl.
CPC ...................................... *G06F 9/542* (2013.01)

(58) Field of Classification Search
USPC ....................................................... 719/318
See application file for complete search history.

(56) References Cited

U.S. PATENT DOCUMENTS

| 7,742,414 B1 | 6/2010 | Iannaccone et al. |
| 8,326,968 B1 | 12/2012 | Drescher |
| 2004/0088510 A1* | 5/2004 | Hori ............................ 711/165 |
| 2004/0153849 A1 | 8/2004 | Tucker et al. |

(Continued)

FOREIGN PATENT DOCUMENTS

JP    11212821 A    8/1999

OTHER PUBLICATIONS

P. Politopoulos, et al, "Evaluation of Compression of Remote Network Monitoring Data Streams," Institute of Computer Science, Network Operations and Management Symposium Workshops, NOMS Workshops 2008, Jul. 11, 2008, IEEE, pp. 109-115, DOI 10.1109/NOMSW.2008.1.

(Continued)

*Primary Examiner* — Duc C Ho
(74) *Attorney, Agent, or Firm* — Penny L. Lowry; Grant Johnson (57) ABSTRACT

Programmable data recorders are provided in a network semiconductor chip to monitor and record all or portions of data from various interfaces, including the input and output interfaces of network links interfacing the chip. A data recorder is provided for each network link. The data recorders store captured data in storage arrays. Data may be compressed and associated with time stamps to conserve space in the storage arrays. A data recorder manager in the chip may start and stop the data recorders at approximately the same time. The programmable mode of the data recorders determines which interfaces are monitored, the portion of data captured, and the format of the data in the storage arrays.

12 Claims, 5 Drawing Sheets

(56) References Cited

U.S. PATENT DOCUMENTS

| | | |
|---|---|---|
| 2005/0125807 A1 | 6/2005 | Brady et al. |
| 2006/0114762 A1* | 6/2006 | Kanai ................... 369/30.09 |
| 2009/0058995 A1 | 3/2009 | Yamashita |
| 2012/0039331 A1 | 2/2012 | Astigarraga et al. |
| 2014/0359639 A1* | 12/2014 | Clark et al. ................ 719/318 |
| 2014/0359641 A1 | 12/2014 | Clark et al. |

OTHER PUBLICATIONS

Clark, S. et al, "Integrated Link-Based Data Recorder for Semiconductor Chip,", U.S. Appl. No. 13/909,686, filed Jun. 4, 2013.

* cited by examiner

INTEGRATED LINK-BASED DATA RECORDER FOR SEMICONDUCTOR CHIP

CROSS-REFERENCE TO RELATED APPLICATIONS

This application is a continuation of co-pending U.S. patent application Ser. No. 13/909,686 filed Jun. 4, 2013. The aforementioned related patent application is herein incorporated by reference in its entirety.

BACKGROUND

This disclosure relates generally to semiconductor chip design, and more particularly to integrated debugging capabilities for network semiconductor chips, such as switches and routers. Switches are devices generally used to connect computers, printers, servers, and other devices to form a network. A switch may serve as a controller, enabling networked devices to talk to each other efficiently. Routers are devices generally used to connect networks. A router may link computers to the Internet, so users can share the connection. A router may act as a dispatcher, choosing the best path for information to travel. Network chips, including routers and switches, are being designed with greater numbers of links, and network systems are being populated with greater numbers of network chips. During design and bring-up, networking chips are conventionally debugged using external logic analyzers.

SUMMARY

Disclosed herein are embodiments of a system and method for capturing data in a network semiconductor chip. The chip interfaces with a number of network links. A number of programmable data recorders are provided in the chip, one data recorder for each network link. The data recorder at each link monitors various data interfaces in the chip, including an input interface and an output interface of the network link. Each data recorder includes a storage array for storing a portion of the data crossing a selected interface. The programmable mode of the data recorder may determine which interfaces are monitored, what portion of the monitored data is captured, and the format of the data stored in the storage arrays.

Each data recorder may also include a data compression module. The data compression module inspects the data targeted for capture. If consecutive data packets satisfy a requirement, for example if the packets are the same, then the data compression module associates a time stamp with the data. The time stamp represents the number of consecutive data packets satisfying the requirement. The time stamp is stored in the storage array along with the data.

A data recorder manager is provided in the chip. The data recorder manager communicates with each data recorder. The data recorder manager may stop and start some or all of the data recorders substantially simultaneously.

BRIEF DESCRIPTION OF THE DRAWINGS

In the figures and description, like numbers generally refer to like components, parts, steps, functional blocks, and processes.

DETAILED DESCRIPTION

Network semiconductor chips, such as switches and routers, transfer data from source links to destination links. The design of network chips can vary. For example, a network chip may interface with 136 links, while other network chips may interface with more or fewer links. Each link has an input and an output. Traffic enters a network chip on a source link and exits a network chip on a destination link. The data traffic may arrive addressed to a particular destination link, or the chip may determine the destination link. The network chip receives data from the source link and transfers that data to the destination link in the proper format.

For example, data may arrive on Link 5 addressed to Link 81, and data may also arrive on Link 90 addressed to Link 81. In some chip designs, the two requests for Link 81 may be arbitrated to determine the order in which the requests for Link 81 are processed. When the arbitration completes, the winning request's data is placed on a data crossbar and routed to Link 81. The losing request's data will be transferred to Link 81 at a later time, possibly after additional arbitrating. Some chip designs may have multiple arbiters and multiple data crossbars. Other chip designs may use methods other than arbitration for determining how competing requests are processed.

For another example, the network chip may determine that data arriving on Link 5 should be routed to Link 35, that data arriving on Link 90 should be routed to Link 18, and that data arriving on Link 91 should be routed to Link 5. The chip's internal logic may include a number of interfaces with a number of internal modules involved in determining which destination link is appropriate for data arriving on a particular source link.

More complex chip designs can lead to greater potential for problems due to design, implementation, and/or manufacturing errors. A network chip may have data integrity issues, routing issues, and performance issues, as well as any number of other issues. Data integrity issues may be suspected when a data packet gets corrupted as it passes through the network chip. Routing issues may be suspected when a data packet is transferred to the wrong link, or when a data packet arrives at the network chip but never reaches its destination. Performance issues may be suspected when some pairs of links experience a high throughput while other pairs of links experience a low throughput. These and other problems can be difficult to debug in large and complex switches, routers, and other network chips.

In complex network systems, where multiple chips may be connected and each chip may have multiple links, using logic analyzers for chip and system debug becomes impractical. For example, a switch chip may have 136 links, and a fully-populated system may have 32 of these switch chips. Debugging such large systems would require using multiple expensive logic analyzers, and even if enough external analyzers were available, it may be difficult to gain physical access to the chips with the logic analyzer probes. Furthermore, on-board trace arrays within the chip may be of limited use due to the size and functionality constraints of such on-board trace arrays.

Disclosed herein are embodiments of a highly-configurable on-board data recorder system and method for capturing trace data within the chip itself. Extra storage elements and special logic are designed into the chip for capturing traffic entering the chip, traffic exiting the chip, and traffic routed through the chip. Such captured data may then be retrieved and analyzed using a computer system, for example with software designed to retrieve and display the contents of the extra storage elements on a display. Embodiments disclosed herein may be especially useful for debugging networking chips that process a continuous flow of data packets, providing a smart on-chip data analyzer that may ease lab debug and potentially save millions of dollars in expenditures for external analyzers.

Figure 1:
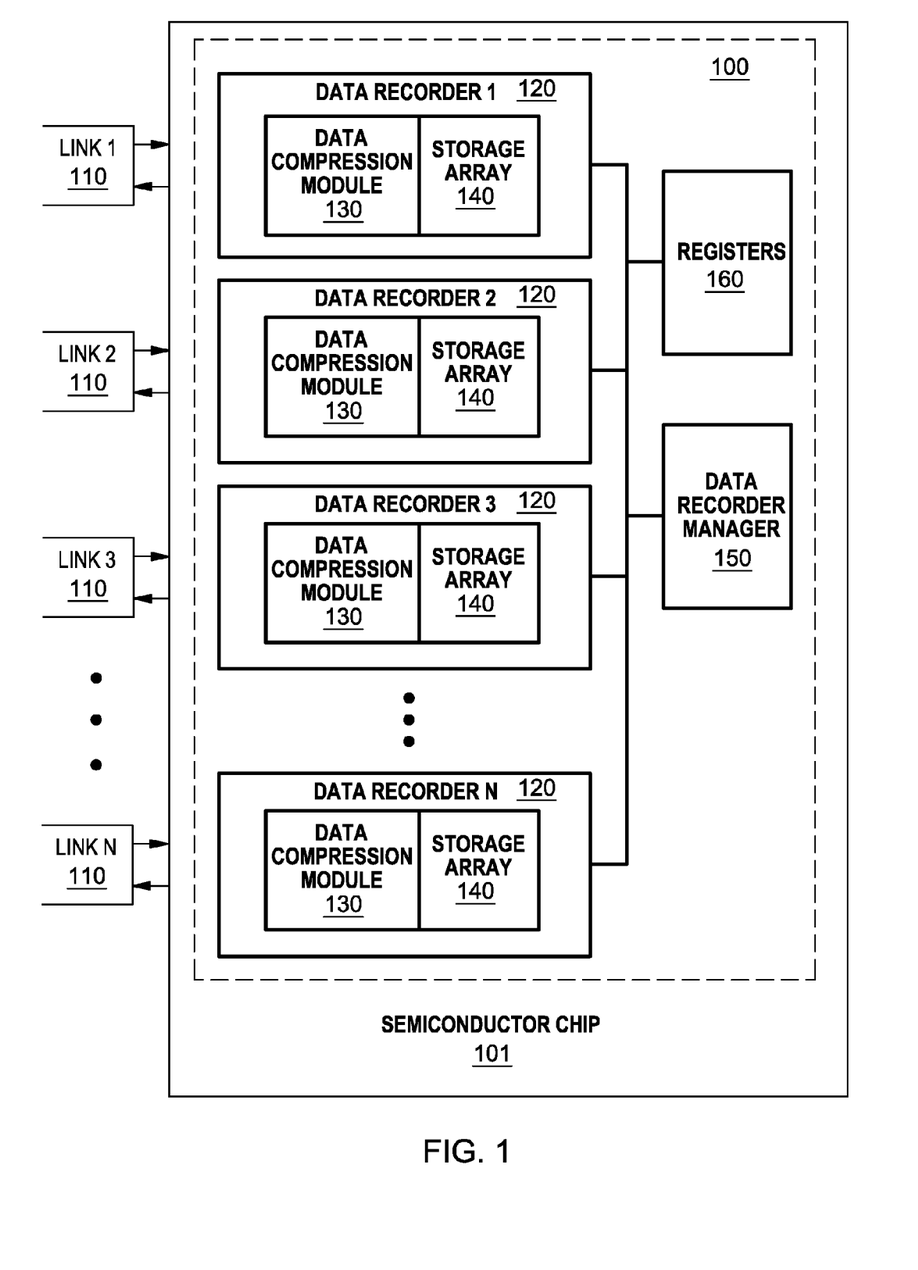
FIG. 1 is a block diagram of an example system for capturing data in a network semiconductor chip.

FIG. 1 illustrates a block diagram of an example system 100 for capturing data in a network semiconductor chip 101. Chip 101 is designed to support a number N of network links 110, each of the N links with an input to chip 101 and an output from chip 101. A data recorder 120 is associated with each network link 110, and there are N data recorders in system 100. There is one data recorder 120 for each link 110. Each data recorder 120 is configured to monitor one or more of various data interfaces associated with chip 101. The monitored interfaces may include both the input interface and the output interface of the data recorder's associated link. In addition, the monitored interfaces may include various interfaces internal to chip 101. Data recorders 120 may capture structured data, unstructured data, and logic states on the various monitored interfaces.

Within each data recorder 120 is a storage array 140 for storing data captured by data recorder 120. Also within each data recorder 120 may be a data compression module 130 for associating time stamps with stored data records. Time stamps, as used herein, are a form of counter or repetition monitor. Time stamps may represent, for example, the number of times that stored data repeated, or the number of idle cycles between stored valid data cycles. The operation of the data compression module is variable based on the programmable mode of data recorder 120.

Depending on its programmable mode, a data recorder 120 may capture all or only part of the data on a monitored interface. For example, a data recorder may be configured with a sampling rate, where data is inspected and/or captured only periodically. For another example, a data recorder may be configured to capture only data with a particular signature. Such a signature may be, for example, a particular bit that is set when the data is valid.

Data recorder manager 150 within chip 101 interlocks all data recorders 120 and provides a way for the data recorders to communicate with one another. Data recorder manager 150 may be a central piece of logic in chip 101 that can enable or disable any or all of the data recorders 120 at the same time. Through data recorder manager 150, if one data recorder encounters conditions to stop capturing data, that data recorder may be configured to notify the other recorders, for example by notifying the data recorder manager. Each recorder may be configurable to either observe or ignore such notifications. Data recorders configured to observe notifications to stop capturing data can then stop capturing data at approximately the same time, providing a snapshot of what was happening throughout the chip at the time the failure or other condition was encountered. Data recorder manager 150 may also be configured to notify one or more data recorders to start recording substantially simultaneously. This global start feature allows a user or application to set the configuration parameters for some or all of the data recorders and then start recording on selected data recorders at the same time.

A set of configuration registers 160 in chip 101 controls the operation of the data recorders 120. These registers may be used to determine whether data will be captured by the data recorders, what data will be stored in the storage arrays by the data recorders, and under what conditions the data recorders will stop capturing data. These registers may also be used to determine the storage format of the captured data. Each recorder may be configured individually with dedicated registers, or groups of recorders may be configured with regional or global registers. For example, one recorder may be configured to capture only valid data from its input link interface, while two other recorders may be configured to capture all data from their output link interfaces. In this way, each data recorder has a programmable mode that determines what will be captured in the storage array, and the programmable mode may be determined by the state of configuration bits in registers 160. Depending on the particular problem being observed in the chip, this programmable mode feature enables a user or application to devise a trace capture plan tailored for debugging that particular problem.

Configuration registers 160 may also be used to recover or manipulate the current read pointers and current write pointers that control how data is read and written from the storage arrays. Software for retrieving and displaying the contents of the storage arrays 140 may access these registers. Software for retrieving and displaying the contents of the storage arrays may also display information about the configuration states of the recorders, and about the internal read and write pointers.

Figure 2:
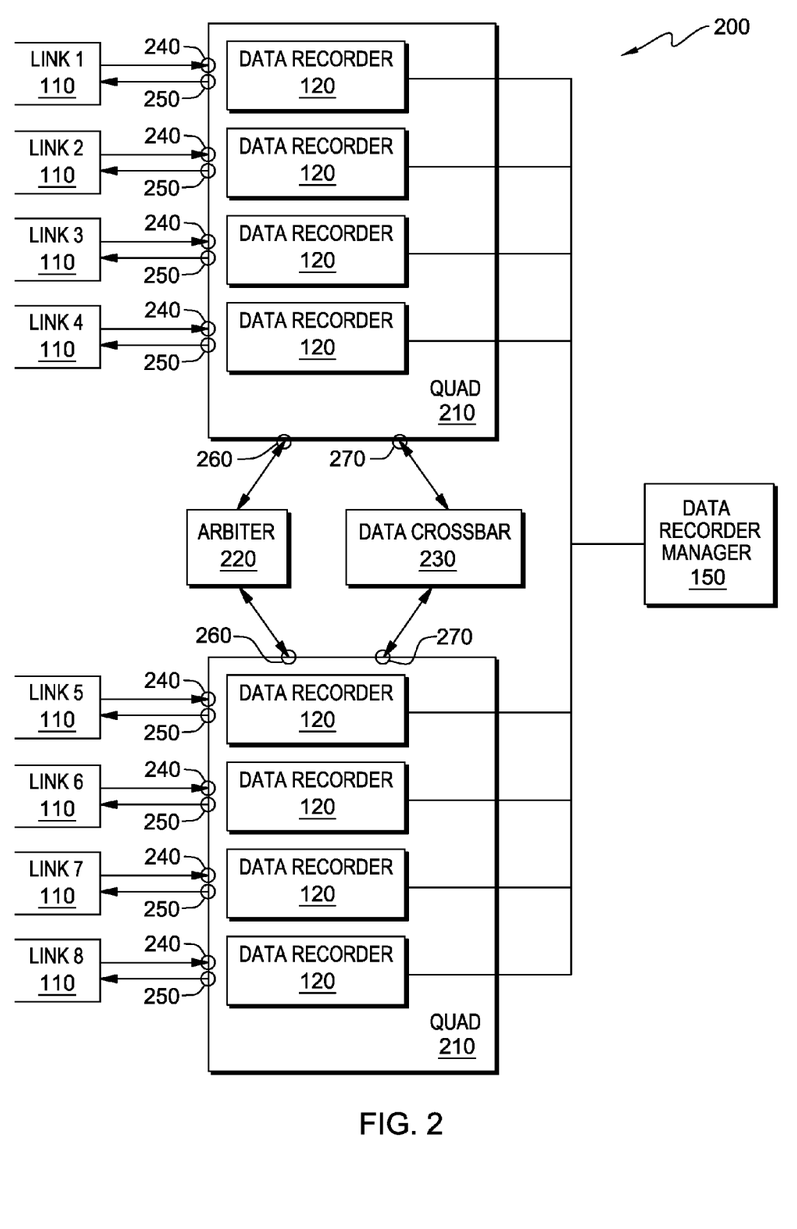
FIG. 2 is a block diagram of a portion of an example system for capturing data in a network semiconductor chip.

FIG. 2 illustrates a block diagram of a portion 200 of an example system for capturing data in a network semiconductor chip. Although the chip is not shown, the disclosed system for capturing data is completely within the network chip, just as system 100 is within chip 101 in FIG. 1. Portion 200 of the example system shows a data recorder 120 for each of the eight links 110. The chip may support more than eight links, but only eight are shown for simplicity. Also for simplicity, the data compression module and storage array in each data recorder 120 are not shown, and the programmable registers for configuring the data recorders 120 are not shown.

In the network chip design of FIG. 2, groups of four links are arranged into data partitions 210 known as quads. Although quads and other chip design features may not be present in every network chip design, embodiments of this disclosure can be tailored to fit any chip design. Embodiments of this disclosure provide for one data recorder per link, therefore each quad 210 will have four data recorders 120. Data recorder manager 150 links all data recorders together for chip-wide synchronized trace capture.

The chip design may provide that requests or data packets within a quad be OR'd together and then presented to arbiter 220. Arbiter 220 may be a single arbiter or may represent multiple arbiters. The quad may then arbitrate for the requested output link, and when granted permission, the data may be transferred through data crossbar 230 and then on to the appropriate link. Data crossbar 230 may be a single crossbar or may represent multiple crossbars. The data recorders 120 are positioned in each link interface. The chip routes signals to the data recorders, and the control logic of embodiments disclosed herein determine how and when to capture those signals based on the programmable mode of the data recorders.

Each data recorder 120 is configured to monitor one or more of various data interfaces associated with the chip. In example system 200, any data recorder may be configured to monitor one or more of link input interface 240, link output interface 250, arbiter interface 260, and/or data crossbar interface 270. In the chip design of FIG. 2, four different data recorders may monitor the same arbiter and data crossbar interfaces. Embodiments disclosed herein provide for monitoring link input interface 240 and link output interface 250 for all chip designs. Embodiments may also provide for monitoring internal interfaces, such as arbiter interface 260, and data crossbar interface 270 shown in FIG. 2, depending on whether or not internal interfaces are available and whether or not the user or application is interested such monitoring.

Figure 3:
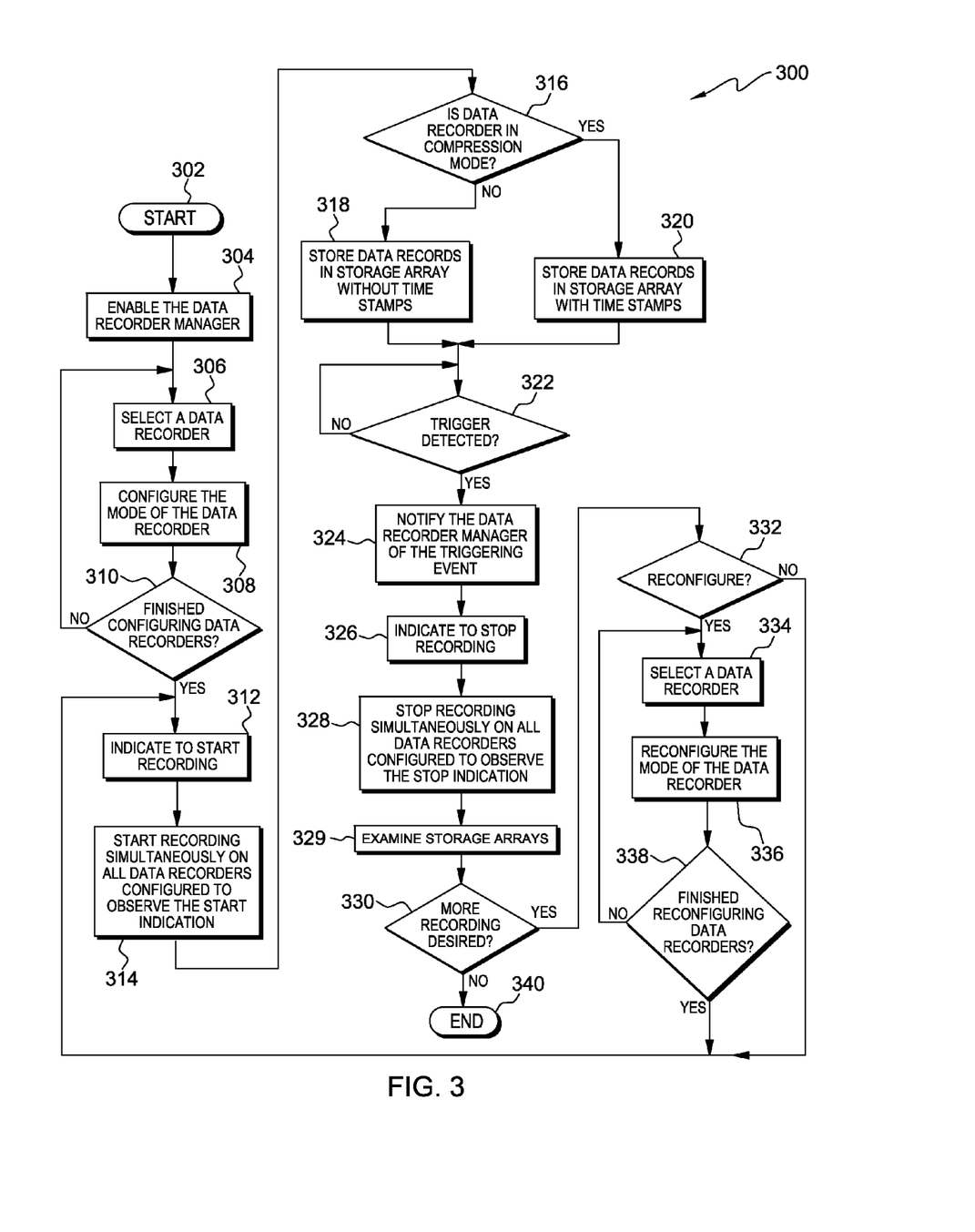
FIG. 3 is a flow diagram for an example method for capturing data in a network semiconductor chip.

In FIG. 3, a flow diagram illustrates an example method 300 for capturing trace data in a network semiconductor chip. Process 300 begins at block 302, and the data recorder manager is enabled at block 304. In some embodiments, the data recorder manager may be enabled simply by providing power. In some embodiments, the data recorder manager may be enabled by manipulating one or more registers on the network chip, or in some other way. The data recorder manager provides for synchronized starting and stopping of all or selected data recorders in the chip.

At block 306, a data recorder is selected. The programmable mode of the selected data recorder is then configured at block 308. With the programmable mode, a user or application is able to selectively configure the data recorder's operation. The particular configuration options may vary among embodiments. The available configuration options allow a user or application to tailor the operation of the data recorder in order to maximize the potential for recording specific trace data that will be useful in debugging the chip. The programmable modes may allow determining, for example, which data interfaces are monitored, the types of data captured for storage, which portion of the data is captured, whether and how data compression is enabled, whether the data recorder will observe or ignore global indications to start and stop recording, how to respond to errors and other triggering events, and whether to stop or continue when the storage array is full. It is important to note that not every embodiment is required to have every configuration option available. An embodiment may have none, some, or all of the above-mentioned configuration options, and may have configuration options not described here.

After the selected data recorder is configured, block 310 determines if the user or application is finished configuring the data recorders. If not, then another data recorder is selected at block 306, and the newly selected data recorder is configured at block 308. Depending on the particular problem being debugged, a user or application may select and configure all the data recorders on the chip, or may select and configure a subset of the data recorders. Each data recorder may be selected and configured independently of the others. For example, a first data recorder may be configured for continuous data capture of all data on the link input interface, while a second data recorder may be configured to capture only valid data on the link output interface. For a second example, eight data recorders may be configured to capture only header data on the link input interface, sixteen other data recorders may be configured to capture random logic latch values used for processing data packets on the link input interface, and the remaining data recorders may be configured to capture all data on the link input interface and the link output interface. For a third example, a first data recorder may be configured for data compression mode, while a number of other data recorders may be configured for no data compression. For a fourth example, a first data recorder may be configured to stop tracing upon detecting a fatal error, a second data recorder may be configured to stop tracing when the storage array is full, and a third data recorder may be configured to stop tracing only when receiving a global indication to stop tracing from the data recorder manager.

After the data recorders are configured, the data recorder manager indicates to start recording at block 312. In some embodiments, this may be a global signal or other indicator that is observable to the individual data recorders. In some embodiments, this may be a message sent to all or selected data recorders. At block 314, all data recorders configured to observe the start indication may then start recording at approximately the same time.

At block 316, if a data recorder is configured for compression mode, then time stamps are stored in the storage array along with the captured data at block 320. This block applies to all data recorders that are currently recording. In compression mode, each data field in a storage record in the storage array is associated with a time stamp field. In some embodiments, the time stamp may represent the number of times that the data represented in the data field was repeated. For example, if data from a first data cycle is stored in the data field, then the time stamp may represent the number of consecutive cycles following that first data cycle that the same data was repeated. In some embodiments, the time stamp may represent the number of times that data following the data represented in the data field was repeated. For example, if valid data from a first data cycle is stored in the data field, then the time stamp may represent the number of consecutive cycles following that first data cycle with invalid data.

If a data recorder is not configured for compression mode at block 316, then no time stamps are associated with the data captured by the data recorder at block 318. At block 322, all data recorders that are currently recording continue with recording. If a trigger to stop recording is detected at block 322, then the data recorder manager is notified of the triggering event at block 324. In some embodiments, the trigger may be detected by one or more of the data recorders. In such embodiments, a data recorder detecting a trigger may signal that a trigger has been detected, and may stop recording or may continue recording. The data recorder manager may actively look for such signals, for example by polling or monitoring, or the data recorder manager may passively be notified of such signals, for example by receiving a message. In some embodiments, the trigger may be detected by the data recorder manager. For example, the data recorder manager may be configured to stop the data recorders after a fixed number of data cycles or some other global event.

After receiving the notification, the data recorder manager may then indicate to stop recording at block 326. In some embodiments, this may be a global signal or other indicator that is observable to the individual data recorders. In some embodiments, this may be a message sent to all or selected data recorders. At block 328, all data recorders configured to observe the stop indication may then stop recording at approximately the same time.

Some or all of the trace data captured in the storage arrays may then be examined at block 329. This may be accomplished by manipulating the programmable configuration registers. For example, the registers may be used to recover the current read pointer and the current write pointer into a particular storage array, and to retrieve some or all of the contents of the storage array. In some embodiments, the current read pointer may point to the oldest valid data in the storage array, and the current write pointer may point to the storage location following the newest valid data. If the storage array had rolled over during the last recording, these pointers may point to the same location in the storage array. After examining the trace data, a user or application may decide whether additional recording is desired at block 330.

At block 330, if no further tracing is desired, process 300 ends at block 340. But if, at block 330, a user or application determines that additional tracing is needed, for example to get additional clues as to the root of an observed chip problem, then process 300 continues. Such a determination to continue tracing may be preplanned, or may be made after examining the recorded data. At block 332, if a reconfiguration is desired, then the programmable mode of one or more data recorders may be reconfigured at blocks 334 and 336. After reconfiguration is complete at block 338, process 300 returns to block 312 and recording is restarted.

Although process 300 identifies a number of specified functional blocks performed in a specified order, some embodiments may perform these specified blocks in a different order. Additionally, some embodiments may perform more or fewer blocks. Furthermore, some embodiments may break down the function of a specified block into multiple blocks, and some embodiments may combine several specified blocks into a single block.

Figure 4:
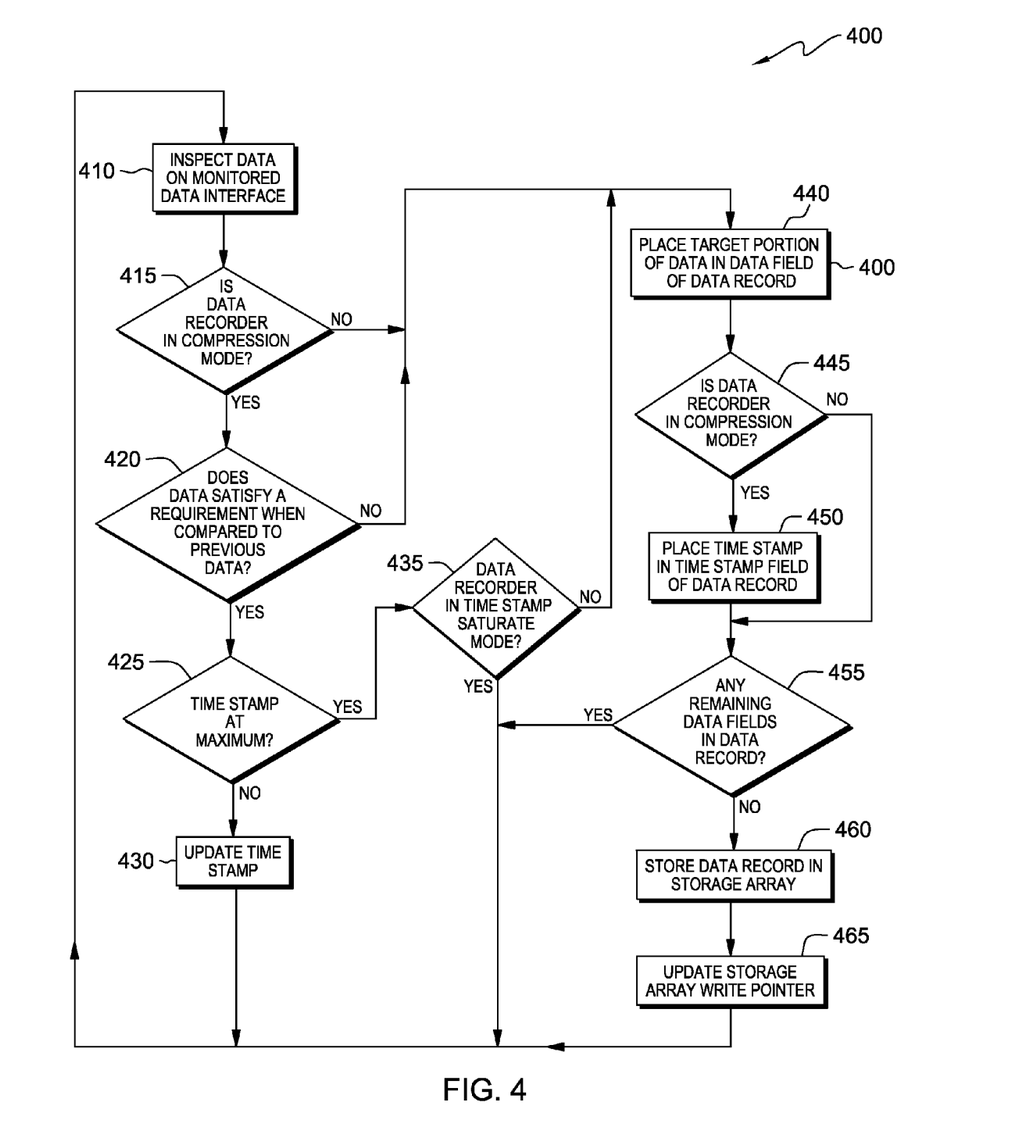
FIG. 4 is a flow diagram for an example method for building and storing data records when capturing data in a network semiconductor chip.

The flow diagram in FIG. 4 illustrates an example method 400 for building and storing data records when capturing trace data in a network semiconductor chip. Process 400 is continuous during data recording, and is the same for each data recorder and for each selected data interface. At block 410, the data recorder inspects the data on a selected data interface. The data on the selected interface may be in a particular data format with a fixed bit length. For example, the data may be organized into data packets with a bit length of 100 bits. The data may be organized into header data and payload data, or may be organized in some other way. The user or application with interest in tracing the selected interface may be aware of the format of the data on the interface, and if so, may configure the data recorder to capture all of the data or only the parts of the data that are of interest.

At block 415, if the data recorder is configured for data compression, then the recorder will determine whether to store the current data or to update a time stamp associated with previously stored data. If the current data satisfies a requirement when compared to previous data at block 420, then the recorder will update the time stamp associated with that previous data. The requirement can be, for example, that the current data be identical to the previous data, that a field of the current data be identical to the same field in the previous data, that the current data is invalid, or that some other criteria is met. The previous data may have arrived immediately prior to the current data, or intervening data may have arrived between the previous data and the current data.

If the time stamp associated with the previous data has reached a maximum value at block 425, then the recorder may either allow the time stamp to saturate, or store the current data with a new time stamp. If the data recorder is configured to saturate the time stamp at block 435, then the time stamp remains at its maximum value and the data recorder returns to block 410 to inspect the next data on the selected interface. If the data recorder is not configured to saturate the time stamp at block 435, then the current data will be stored. Back at block 425, if the time stamp has not reached a maximum value, then the time stamp is updated at block 430 and the data recorder returns to block 410 to inspect the next data on the selected interface.

Although the time stamp is associated with specific recorded data, there are a variety of ways to represent this association. For example, the time stamp may represent the number of times that the associated data repeated, or the number of times that part of the associated data repeated. For another example, the time stamp may represent the number of times that the data following the associated data repeated. For another example, the time stamp may represent the number of invalid data cycles following the associated data. Furthermore, the format of the time stamp may be adjustable, and may be determined by the programmable mode of the data recorder. For example, if the data is organized into data packets, the time stamp may be the actual number of consecutive data packets following a first data packet that were identical to the first data packet. To delay the time stamp's reaching a maximum value, the time stamp may be a quotient of the actual number of consecutive data packets. For example, a time stamp of 10 may represent 10×4=40 consecutive data packets, or 10×8=80 consecutive data packets. In such examples, a loss of a few digits of significance may be a worthwhile sacrifice for gaining the ability to capture longer periods of repetition. To further delay the time stamp's reaching a maximum value, the time stamp may be a logarithm of the actual number of consecutive data packets. Any method for tracking or estimating the number of consecutive data packets is contemplated, so long as the time stamp can be decoded into at least an approximation of the number of consecutive data packets.

Back at block 420, if the current data fails to satisfy a requirement when compared to previous data, or if at block 435 the data recorder is not in time stamp saturate mode, or if at back at block 415 the data recorder is not in compression mode, then the recorder will place a target portion of the current data in an available data field of the current data record at block 440. The target portion stored is determined by the configurable mode of the data recorder. For example, if the format of the data has a bit length of 48 bits, then the target portion may be the entire 48 bits, or the first 37 bits, or the last 29 bits. If the data recorder is in compression mode at block 445, then the time stamp associated with the data is placed in a time stamp field of the data record. At block 455, if at least one data field is still available for use in the current data record, then the data recorder returns to block 410 to inspect the next data on the selected interface. Alternatively at block 455, if the data record is complete, having no available data fields to fill, then the record is stored in the data storage array at block 460. A write pointer for keeping track of the next available location in the storage array is updated at 465, and the data recorder returns to block 410 to inspect the next data on the selected interface.

Although the embodiments represented by process 400 show storing the data record only when complete, some embodiments may store the data record more often to avoid losing data, for example on a power failure. Some embodiments may also store incomplete data records before stopping recording, for example when detecting a trigger or when observing an indication to stop recording from the data recorder manager. Furthermore, although process 400 identifies a number of specified functional blocks performed in a specified order, some embodiments may perform these specified blocks in a different order. Additionally, some embodiments may perform more or fewer blocks. Furthermore, some embodiments may break down the function of a specified block into multiple blocks, and some embodiments may combine several specified blocks into a single block.

Figure 5:
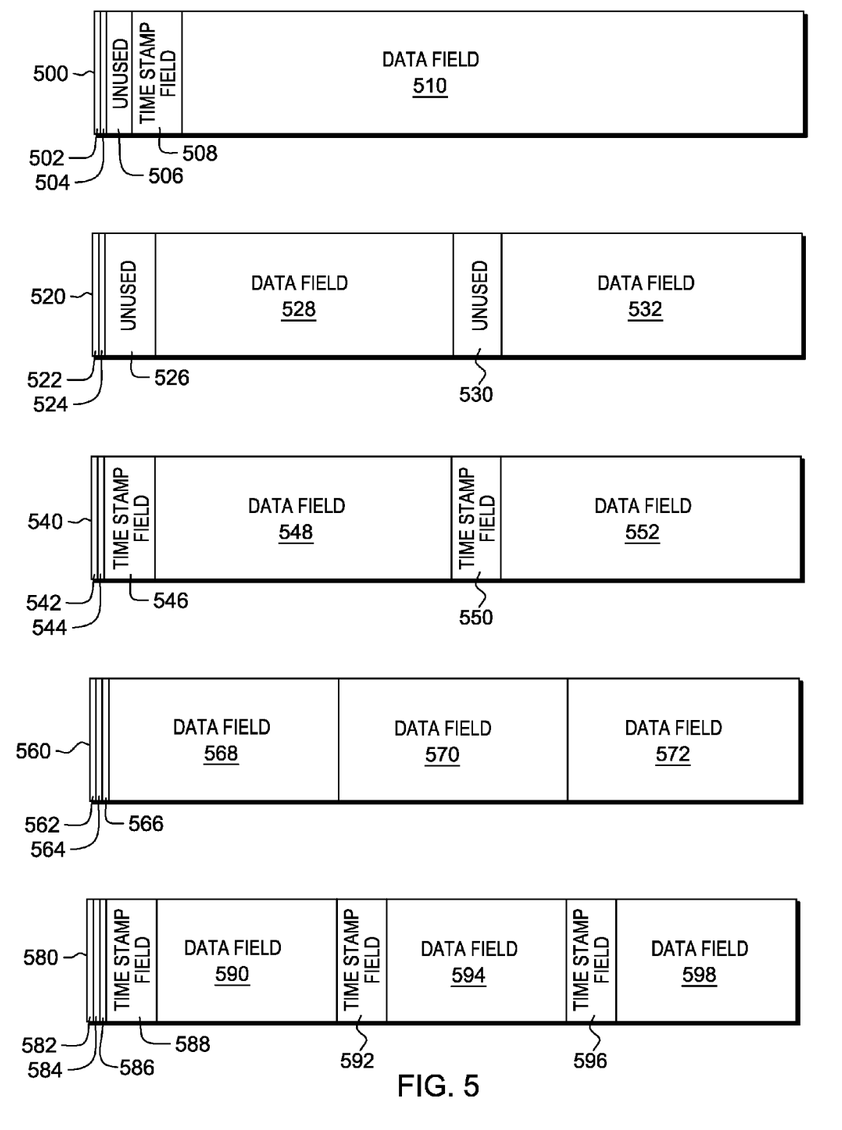
FIG. 5 illustrates example data record formats for capturing data in a network semiconductor chip.

In FIG. 5, data record formats 500, 520, 540, 560, and 580 are five examples of how captured data may be stored in a storage array by a data recorder in a network semiconductor chip. These five data record formats are examples only, and some embodiments may offer all of these formats, none of these formats, or some of these formats. Also, some embodiments may offer data record formats not shown here. The programmable mode of a data recorder may be used to select a data format from among the available data formats. This flexibility allows the user or application to choose a data format that is best suited for the type and quantity of data being captured. Because the programmable mode of the data recorders controls the format of the stored data, a user or application retrieving stored data may use the programmable mode of the data recorder to determine how to interpret the retrieved data.

In the example embodiment of FIG. 5, a data recorder's storage array has a width of 114 bits, making each record in the storage array 114 bits in length, with bit 0 the rightmost bit and bit 113 the leftmost bit. These 114-bit records can be formatted in at least five ways, as shown in data record formats 500, 520, 540, 560, and 580, depending on the programmable mode of the data recorder.

In some programmable modes, the data records are formatted with data record format 500. In data record format 500, bits 0-99 are a single data field 510, bits 100-107 are a single time stamp field 508 associated with data field 510, bits 108-111 are unused field 506, and bits 112 and 113 are parity bits 504 and 502. Data field 510 may be used to capture target data with bit lengths up to 100 bits. Time stamp field 508 may be used to store time stamps when the data recorder is in compression mode, and may be unused when the data recorder is not in compression mode. Parity bit 504 may be used, for example, to store parity over the data field 510, while parity bit 502 may be used to store parity over the remaining field. An advantage of data record format 500 is that the data field size (100 bits) allows for the capture of large amounts of data from a single data cycle. A disadvantage is that the single data field allows for the capture of data from only one data cycle for each data record.

A user may select data record format 500 when the need to capture large amounts of data from individual data cycles outweighs the need to capture a large number of data cycles. For example, a user may select data record format 500 to capture all data on an 80-bit, 91-bit, or 100-bit data bus, with or without compression.

In some programmable modes, the data records are formatted with data record format 520. In data record format 520, bits 0-47 are a first data field 532, bits 48-55 are an unused field 530, bits 56-103 are a second data field 528, bits 104-111 are an unused field 526, and bits 112 and 113 are parity bits 524 and 522. First data field 532 and second data field 528 may be used to capture target data with bit lengths up to 48 bits. Parity bit 524 may be used, for example, to store parity over the first data field 532, while parity bit 522 may be used to store parity over the second data field 528. An advantage of data record format 520 over, for example, data record format 500 is that the two data fields per record allow for the capture of data from twice as many data cycles before filling the storage array. A disadvantage is that the data field sizes (48 bits) are smaller.

A user may select data record format 520 when the need to capture a larger number of data cycles outweighs the need to capture larger amounts of data from individual data cycles, or when the data being captured has a bit length small enough to fit in the data fields. For example, a user may select data record format 520 to capture all data on a 48-bit data bus, or only part of the data on larger data buses.

In some programmable modes, the data records are formatted with data record format 540. Data record format 540 is similar to data record format 520, except that the unused fields are used for storing time stamps. In data record format 540, bits 0-47 are a first data field 552, bits 48-55 are a first time stamp field 550 associated with first data field 552, bits 56-103 are a second data field 548, bits 104-111 are a second time stamp field 546 associated with second data field 548, and bits 112 and 113 are parity bits 544 and 542. First data field 552 and second data field 548 may be used to capture target data with bit lengths up to 48 bits. First time stamp field 550 and second time stamp field 546 may be used to store time stamps when the data recorder is in compression mode. Parity bit 544 may be used, for example, to store parity over the first data field 552 and first time stamp field 550, while parity bit 542 may be used to store parity over the second data field 548 and the second time stamp field 546. A user may select data record format 540 for reasons similar to selecting data record format 520, but with the additional need for data compression.

In some programmable modes, the data records are formatted with data record format 560. In data record format 560, bits 0-36 are a first data field 572, bits 37-73 are a second data field 570, bits 74-110 are a third data field 568, and bits 111, 112, and 113 are parity bits 566, 564, and 562. First data field 572, second data field 570, and third data field 568 may be used to capture target data with bit lengths up to 37 bits. Parity bit 566 may be used, for example, to store parity over the first data field 572, while parity bit 564 may be used to store parity over the second data field 570, and parity bit 562 may be used to store parity over the third data field 568. An advantage of data record format 560 over, for example, data record format 500 is that the three data fields per record allow for the capture of data from three times as many data cycles before filling the storage array. A disadvantage is that the data field sizes (37 bits) are smaller.

A user may select data record format 560 when the need to capture a larger number of data cycles outweighs the need to capture larger amounts of data from individual data cycles, or when the data being captured has a bit length small enough to fit in the data fields. For example, a user may select data record format 560 to capture only part of the data on 48-bit data buses.

In some programmable modes, the data records are formatted with data record format 580. Data record format 580 is similar to data record format 560, except that the data fields are slightly smaller to make room for storing time stamps. In data record format 580, bits 0-28 are a first data field 598, bits 29-36 are a first time stamp field 596 associated with first data field 598, bits 37-65 are a second data field 594, bits 66-73 are a second time stamp field 592 associated with second data field 594, bits 74-102 are a third data field 590, bits 103-110 are a third time stamp field 588 associated with third data field 590, and bits 111, 112, and 113 are parity bits 586, 584, and 582. First data field 598, second data field 594, and third data field 590 may be used to capture target data with bit lengths up to 29 bits. First time stamp field 596, second time stamp field 592, and third time stamp field 588 may be used to store time stamps when the data recorder in compression mode. Parity bit 586 may be used, for example, to store parity over the first data field 598 and the first time stamp field 596, while parity bit 584 may be used to store parity over the second data field 594 and the second time stamp field 592, and parity bit 582 may be used to store parity over the third data field 590 and the third time stamp field 588. A user may select data record format 580 for reasons similar to selecting data record format 560, but with the additional need for data compression.

The particular data record formats, record fields, and record field sizes in FIG. 5 are shown for example only. Embodiments may include other formats not shown, as the data record format may depend on the design and intended use of the networking semiconductor chip hosting the data recorder system. For example, although all time stamp fields shown in FIG. 5 are 8 bits in size, a time stamp field may be larger than 8 bits or smaller than 8 bits in any particular embodiment. For another example, although the data record formats shown in FIG. 5 all include parity bits as a form of error detection over particular data fields, some embodiments may use parity bits in a different way, may use another form of error detection, or may not use a form of error detection.

Embodiments of a system and method for capturing data in a network semiconductor chip as described herein may require semiconductor IC logic design, simulation, test, layout, and manufacture. Processes, machines and/or mechanisms for processing design structures or devices to generate logically or otherwise functionally equivalent representations of the design structures and/or devices described above and shown in the figures may be utilized. Design structures processed and/or generated may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flows may vary. For example, a design flow for building an application specific IC (ASIC) may differ from a design flow for designing a standard component or from a design flow for instantiating the design into a programmable array, for example a programmable gate array (PGA) or a field programmable gate array (FPGA) offered by Altera® Inc. or Xilinx® Inc.

A design structure may be a logical simulation design structure generated and processed by a design process to produce a logically equivalent functional representation of a hardware device. A design structure may also or alternatively comprise data and/or program instructions that when processed by a design process generate a functional representation of the physical structure of a hardware device. Whether representing functional and/or structural design features, a design structure may be generated using electronic computer-aided design (ECAD) such as implemented by a core developer/designer. When encoded on a machine-readable data transmission, gate array, or storage medium, a design structure may be accessed and processed by one or more hardware and/or software modules within a design process to simulate or otherwise functionally represent an electronic component, circuit, electronic or logic module, apparatus, device, or system such as those shown in the figures. As such, a design structure may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

A design process may employ and incorporate hardware and/or software modules for synthesizing, translating, or otherwise processing a design/simulation functional equivalent of the components, circuits, devices, or logic structures shown in the figures to generate a netlist which may contain design structures. The netlist may comprise, for example, compiled or otherwise processed data structures representing a list of wires, discrete components, logic gates, control circuits, I/O devices, models, etc. that describes the connections to other elements and circuits in an integrated circuit design. The netlist may be synthesized using an iterative process in which the netlist is resynthesized one or more times depending on design specifications and parameters for the device. As with other design structure types described herein, the netlist may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design processes may include hardware and software modules for processing a variety of input data structure types including a netlist. Such data structure types may reside, for example, within library elements and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications, characterization data, verification data, design rules, and test data files which may include input test patterns, output test results, and other testing information. The design process may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in the design process without deviating from the scope and spirit of the embodiments disclosed herein. The design process may also include modules for performing standard circuit design processes such as timing analysis, verification, design rule checking, place and route operations, etc.

The design process may employ and incorporate logic and physical design tools such as HDL compilers and simulation model build tools to process a design structure together with some or all of the depicted supporting data structures along with any additional mechanical design or data (if applicable), to generate a second design structure. The design structure may reside on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). A design structure may comprise one or more files, data structures, or other computer-encoded data or instructions that reside on transmission or data storage media and that when processed by an ECAD system generate a logically or otherwise functionally equivalent form of one or more of the embodiments of the invention shown in the figures. In some embodiments, a design structure may comprise a compiled, executable HDL simulation model that functionally simulates the devices described herein.

A design structure may also employ a data format used for the exchange of layout data of integrated circuits and/or symbolic data format (e.g. information stored in a GDSII (GDS2), GL1, OASIS, map files, or any other suitable format for storing such design data structures). A design structure may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein. A design structure may then proceed to a stage where, for example, the design structure: proceeds to tape-out, is released to manufacturing, is released to a mask house, is sent to another design house, is sent back to the customer, etc.

The major components of any computer system as described herein may include one or more processors, a main memory, a terminal interface, a storage interface, an I/O (Input/Output) device interface, and a network interface, all of which are communicatively coupled, directly or indirectly, for inter-component communication via a memory bus, an I/O bus, and an I/O bus interface unit. The computer system may contain one or more general-purpose programmable central processing units (CPUs). In an embodiment, the computer system may contain multiple processors typical of a relatively large system; however, in another embodiment the computer system may alternatively be a single CPU system. Each processor may execute instructions stored in the main memory and may comprise one or more levels of on-board cache. Main memory may comprise a random-access semiconductor memory, storage device, or storage medium (either volatile or non-volatile) for storing or encoding data and programs. Main memory may alternatively represent the entire virtual memory of the computer system, and may also include the virtual memory of other computer systems coupled to the computer system or connected via a network. Main memory may be conceptually a single monolithic entity, but in some embodiments, main memory is more complex, such as a hierarchy of caches and other memory devices. Main memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

Embodiments described herein may be in the form of a system, a method, or a computer program product. Accordingly, aspects of embodiments of the disclosure may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

While embodiments of the disclosure have been described with reference to the specific aspects thereof, those skilled in the art will be able to make various modifications to the described aspects without departing from the true spirit and scope of the various embodiments. The terms and descriptions used herein are set forth by way of illustration only and are not meant as limitations. Those skilled in the art will recognize that these and other variations are possible within the spirit and scope of the embodiments as defined in the following claims and their equivalents.

What is claimed is:

1. A method for capturing data in a network semiconductor chip, the network semiconductor chip interfacing a number of network links, the method comprising:
configuring a plurality of a number of data recorders in the network semiconductor chip, the number of data recorders equal to the number of network links, each data recorder associated with a network link, each data recorder for monitoring a plurality of data interfaces, the plurality of data interfaces including an input interface of the associated network link and an output interface of the associated network link, each data recorder having a programmable mode;
enabling a data recorder manager in the network semiconductor chip, the data recorder manager in communication with the number of data recorders;
recording, by the plurality of data recorders, a target portion of the data crossing a selected data interface, the target portion determined by the programmable mode of each of the plurality of data recorders;
indicating, by the data recorder manager, to stop recording, the indicating in response to a triggering event; and
stopping recording, substantially simultaneously by a plurality of the recording data recorders.

2. The method of claim 1, wherein at least one of the recording data recorders continues recording, the at least one of the recording data recorders configured to ignore the indicating to stop recording.

3. The method of claim 1, further comprising:
indicating, by the data recorder manager, to start recording;
starting recording, substantially simultaneously by the plurality of data recorders.

4. The method of claim 1, further comprising:
detecting the triggering event by a first data recorder; and
notifying the data recorder manager of the triggering event.

5. The method of claim 1, wherein the data crossing the selected data interface is in a data format, the data format having a bit length, and wherein the target portion of the data crossing the selected data interface has a target bit length, the target bit length less than the bit length.

6. The method of claim 5, wherein the selected data interface is a data bus having a data bus width, and wherein the bit length is the data bus width.

7. The method of claim 5, further comprising:
modifying the programmable mode of a first data recorder; and
restarting recording, by the first data recorder, of a second target portion of the data crossing the selected data interface, the second target portion having a second target bit length, the second target bit length different from the target bit length, the second target portion determined by the programmable mode of the first data recorder.

8. The method of claim 1, wherein the plurality of data interfaces further includes at least one of an internal arbiter interface and an internal data crossbar interface.

9. The method of claim 1, wherein the recording the target portion of the data crossing the selected interface comprises:
recording the target portion during a first data cycle;
recording a time stamp associated with the target portion recorded during the first data cycle;
monitoring the target portion during consecutive data cycles following the first data cycle, the monitored target portion satisfying a requirement when compared to the target portion recorded during the first data cycle, the requirement determined by the programmable mode of the at least one data recorder; and
updating the time stamp, the updated time stamp representing the consecutive data cycles.

10. The method of claim 9, wherein the time stamp reaches a maximum value during the monitoring, wherein the recorded time stamp represents the maximum value, and wherein the recording the target portion of the data crossing the selected interface further comprises:
recording the target portion during a subsequent data cycle following the consecutive data cycles;
recording a second time stamp associated with the target portion recorded during the subsequent data cycle;
monitoring the target portion during second consecutive data cycles following the subsequent data cycle, the monitored target portion satisfying the requirement when compared to the target portion recorded during the subsequent data cycle; and
updating the second time stamp, the updated second time stamp representing the second consecutive data cycles.

11. The method of claim 9, wherein the recording the target portion of the data crossing the selected interface further comprises:
recording the target portion during a subsequent data cycle following the consecutive data cycles, the target portion recorded during the subsequent data cycle failing to satisfy the requirement when compared to the target portion recorded during the first data cycle;
recording a second time stamp associated with the target portion recorded during the subsequent data cycle.

12. The method of claim 11, wherein the first data cycle is an idle cycle, wherein the consecutive data cycles are consecutive idle cycles, and wherein the subsequent data cycle is a valid cycle.

* * * * *